Patented May 9, 1939

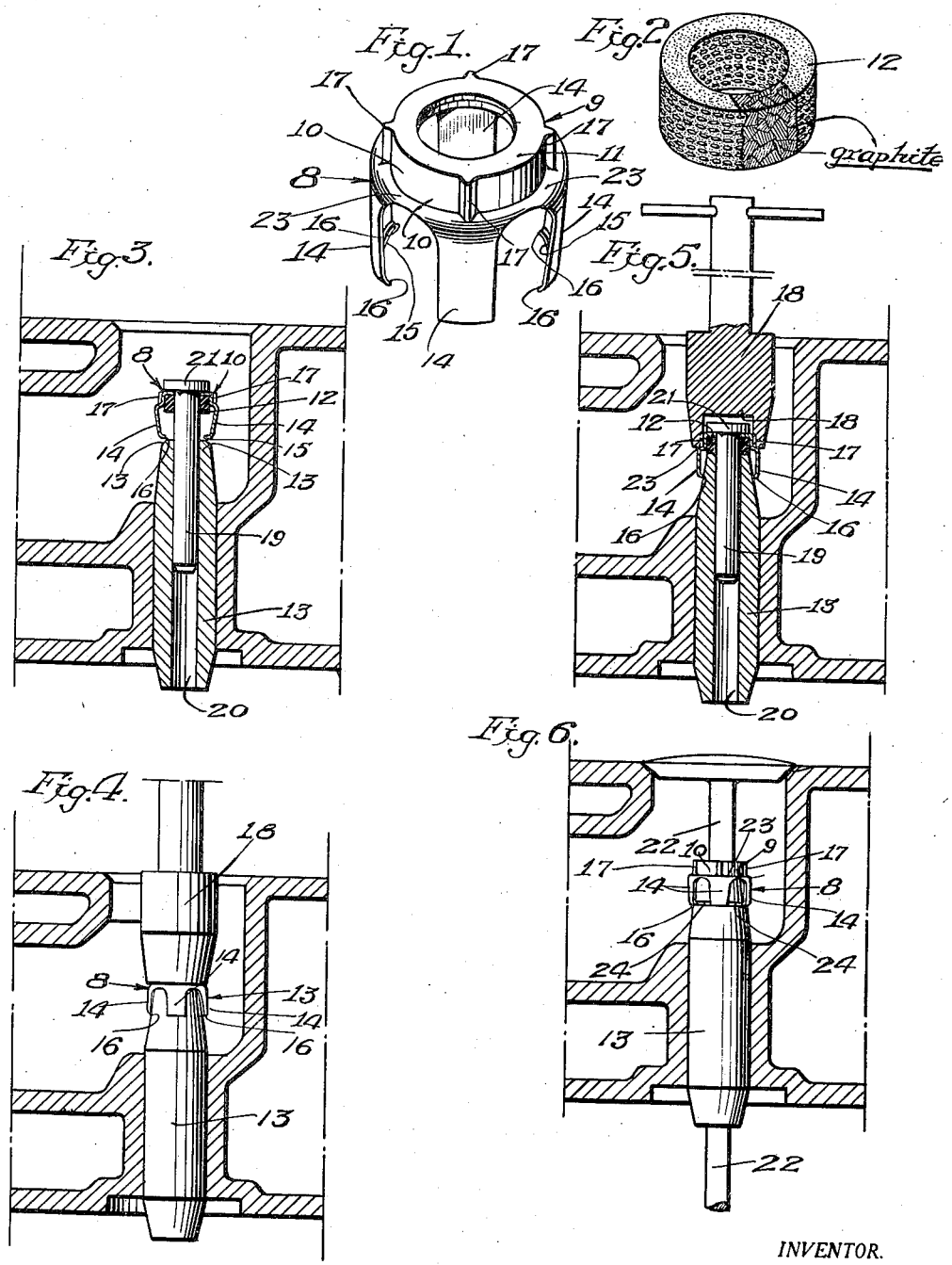

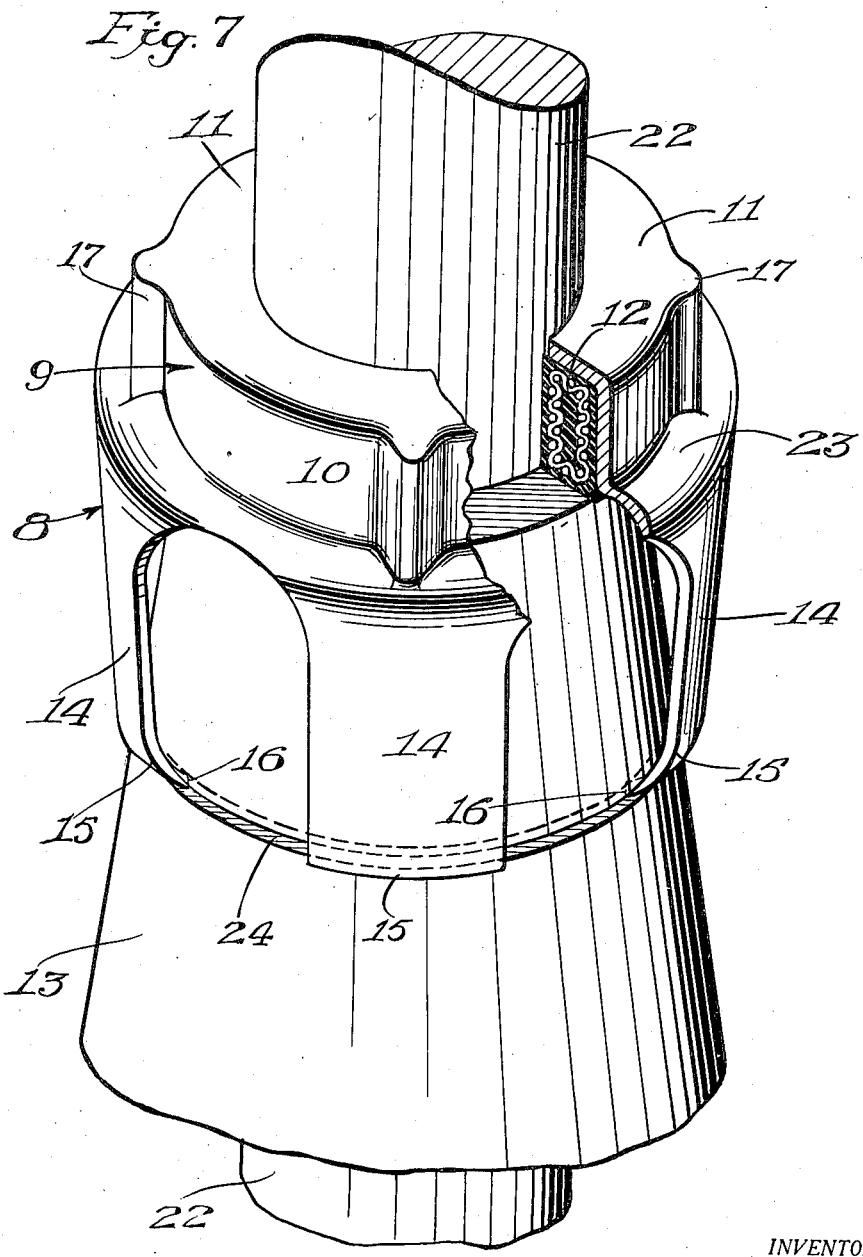

2,157,868

UNITED STATES PATENT OFFICE 2,157,868

METHOD OF PACKING VALVE STEMS AND APPARATUS THEREFOR

Delmar D. Robertson, Lansdowne, and George L. Briggs, Bryn Mawr, Pa., assignors to Wilkening Manufacturing Company, Philadelphia, Pa., a corporation of Delaware Application December 24, 1935, Serial No. 55,982

6 Claims. (Cl. 29—84)

The present invention relates to a new and useful method or process of packing valve-stems of internal combustion engines or the like and apparatus therefor, whereby the valve-stems of internal combustion engines may be effectively packed or sealed against leakage with the greatest facility and minimum of labor, and whereby the packing may be effected with greater accuracy and greater certainty and greater uniformity of operation.

With the above and other objects in view which will appear more fully from the following detailed description, the present invention comprises the process of applying packing to a valve-stem guide by providing a retainer cage with radially resilient locking fingers having cutting means thereon of a normal diameter less than the diameter of the valve-stem guide, forcing said locking and cutting means over said valve stem guide by a generally axial movement of the cage in relation to the valve-stem guide and then rotating said cage and thereby rotating said interlocking and cutting means whereby an annular groove is cut into the outer surface of the valve-stem guide and said locking means is caused simultaneously to interlock with said groove as it is formed, thereby generally permanently to lock said cage and the sealed member therein onto said valve-stem guide.

The present invention further comprises other novel features and details which may more fully appear from the following detailed description and accompanying drawings.

For the purpose of illustrating the invention, there is shown in the accompanying drawings one form thereof which is at present preferred, since the same has been found in practice to give satisfactory and reliable results, although it is to be understood that the various instrumentalities of which the invention consists can be variously arranged and organized and that the invention is not limited to the precise arrangement and organization of the instrumentalities as herein shown and described.

In the accompanying drawings in which like reference characters indicate like parts, Figure 1 represents a perspective view of a valve-stem packing cage having locking fingers carrying the locking and groove-cutting means;

Figure 2 represents a perspective view of a generally annular sealing member to be applied to the valve stem guide;

Figure 3 represents a vertical sectional view of a valve-stem guide as for instance, an intake passageway of the cylinder block of an engine with the packing cage, a sealing member, and the centering pin in operative relation thereto in the first stage or step of the process or method;

Figure 4 represents a similar view, but shows the valve-stem guide in full, and shows the turning tool applied to the cage and after the interlocking and cutting means has been forced onto the end of the valve stem guide which is to be "packed";

Figure 5 represents a sectional view similar to that shown in Figure 4, but with both valve stem guide as well as the cage and tool shown in section;

Figure 6 represents a vertical sectional view of a fragmentary portion of the cylinder block with the valve-stem guide and cage after the groove has been locked on the valve-stem guide and with the valve in place of the centering pin;

Figure 7 represents a fragmentary perspective view on a much enlarged scale of the finished result of the process or method, partly broken away and in section.

The process or method of the present invention may be applied to any of the forms of conventional valve-stem guides which are of a generally tubular formation and the ends of which project somewhat beyond the portion of the cylinder block or the cylinder head in which they are disposed or in which they form an integral or separable part.

In carrying out the process or method of the present invention, a combined cage and cutting tool designated generally by the numeral 8, and illustrated separately in Figure 1 is provided, having an upper portion 9 comprising a generally upper cylindrical wall end 10, and a transverse terminal wall 11 for receiving and confining a more or less compressible and more or less resilient generally annular packing or sealing member 12 against an end of the valve-stem guide 13, and having a plurality of similar circumferentially distributed locking and cutting fingers 14 spaced generally equi-distantly with respect to the axis of the upper portion 9 and having inwardly projecting locking flanges 15, the ends 16 of which are provided with sharp cutting corners or edges;—with the normal effective diameter of the cutting edges or corners (in the relaxed condition of the tool shown in Figures 1 and 3, for instance), less than the diameter of the valve-stem guide where the interlocking engagement is to be effected.

The combined cage and tool 8 is also provided with a plurality of circumferentially distributed ribs 17 whereby the device may be turned.

The ribs, or other projections or recesses, may be of any suitable number. In the particular illustration shown, four are provided;—defining between them a rectangle. A suitable socket wrench 18 having an internal shape conforming generally to the upper portion 9, including the ribs 17 thereof is provided for turning the combined cage and tool as indicated in Figures 4 and 5.

A centering pin 19 is also provided of a diameter such neatly to fit within the bore 20 of the valve-stem guide and having any suitable head 21 to prevent its passing entirely through the combined cage and cutting tube.

The valve stem 22 is first removed from the valve-stem guide in the usual manner.

A combined cage and cutting tool 8 of suitable size (depending on the external diameter and bore of the valve-stem guide), is threaded onto a centering pin 19 of the suitable diameter with the spring 14 of said tool extending in the direction of the free end of the pin. Then an annular packing or sealing member 12 of suitable external and internal diameter of suitable thickness (depending on the dimension of the particular valve-stem guide) is threaded onto the centering pin 19. Thereafter the free end of the centering pin is inserted into the end of the valve-stem guide which is to be "packed", thereby disposing the aforesaid members in relation to each other as indicated in Figure 3.

Thereafter, a socket wrench type tool or other suitable turning tool (depending on the particular turning locks or turning instrumentalities provided on the cage) is applied to the cage and the cage is then forced in the direction of the valve-stem guide (axial pressure exerted upon the wrench or similar tool 18 thereby forcing the resilient fingers 14 apart against their inherent spring tension (because of the comparitively larger external diameter of the valve-stem guide), until the annular sealing member 12 is pressed up against the end of the valve-stem guide. As most valve-stem guides are slightly tapered at their ends the application of the combined cage and cutting device 8 is facilitated because the spreading of the spring fingers 14 can be more gradual. The spring fingers are shown in their ultimately spread condition in Figure 4 just as the combined cage and cutting tool has been pressed firmly onto the end of the valve-stem guide.

To facilitate the application of the device 8, a slight annular transverse shoulder 23 may be provided intermediate the fingers 14 and the side wall 10 of the upper portion 9 of the combined edge and cutting tool so that the end of the turning tool 18 may bear against this shoulder when it is desired to force the device 8 onto the valve stem guide in an axial direction, that is, from the position shown in Figure 3 to the positions shown in Figures 4 and 5.

While the combined edge and cutting tool 8 is thus held firmly pressed against the sealing member 12 with the latter more or less compressed with such axial pressure, it is turned by means of the turning tool 18, thereby causing the slight cutting edges 16 at the ends of the locking flanges 15 to cut a generally annular groove 24 into the outer surface of the valve-stem guide, in a generally radial direction, and cause the locking flanges 15 to interlock with such groove as it is formed, thereby to lock the combined cage and cutting tool 8 onto the valve-stem guide with the annular sealing member 12 under more or less compression. When the groove has been cut to suitable depth which may be a sixty-fourth to a thirty-second of an inch, or more, depending on the size and other conditions, the turning tool 18 is removed and then the centering pin 19 is removed, and the valve-stem 22 is reinserted into the position shown in Figure 6.

The packing or sealing member 12, as stated, is a more or less compressible and more or less resilient material and may be a composite body formed partly of fibrous material, such as cotton, or asbestos, in which the fibers may be woven, knitted or braided together, or felted together, and having also some binding material interspersed between the fibers or layers of fibrous materials;—the binder preferably being a more or less resilient springy material which will resist the action of oil and gasolene, and which will also resist reasonably high temperatures of perhaps 400 degrees more or less. The binder material used in the particular instance is the resilient springy amorphous organic material which is somewhat regarded as synthetic or artificial rubber because of its likeness to rubber, and forms of which are known in the trade under the trade names "Duprene" and "Thiokol", and others. The outer surface may be covered with graphite, as graphically illustrated in Figure 2 by the fragmentary enlargement of the surface to indicate the disposition of the flakes of graphite on the surface of the sealing member 12.

The locking flanges 15 are generally arcuate, concentrically or coaxially disposed with respect to the axis of the cage.

If desired, the inner circumferential edges of the lowering flanges 15 may be slightly relieved from the cutting corners or edges 16 so as to facilitate the cutting operation.

The combined cage and cutting tool 8 is formed of a suitable grade of steel and is preferably formed of flat sheet steel by suitable punching and forming operations of suitable punching and forming dyes while the material is comparatively soft or in an annealed condition and the combined cage and tool is then subsequently tempered to a spring temper which at the same time gives a sufficient hardness to the sharp cutting corners or cutting edges 16 to cause them to cut into the valve-stem guide when turned as aforesaid.

The claw-like flanges 15 may be deposited generally at a right angle to the locking and cutting fingers 14 or at a right angle to the axis of the device, or they may be slightly inclined, as indicated particularly in Figures 1, 5 and 7, whereby the axial compression on the generally annular sealing member 12 may be increased slightly as the depth of the groove is increased, by virtue of the fact that the claw-like flange will give the entire cage a slight camming action in an axial direction, tending to pull the cage further onto the valve stem as the depth of the groove is increased from the initial cut to the final depth of the groove.

Having thus described the invention, what is hereby claimed as new and desired to be secured by Letters Patent is:

1. The method of applying to valve stem guides a packing and a packing retainer cage provided with a plurality of circumferentially distributed radially resilient spring fingers having combined locking and groove-cutting means at their free ends, comprising forcing the combined cage and the groove-cutting means onto the valve-stem guide in a generally axial direction against the radial resiliency of said resilient spring fingers until the said packing is axially compressed between the cage and the end of the valve-stem guide, and turning said combined cage and groove-cutting means while the same are in this last mentioned position until a substantial annular groove is cut into the exterior of the valve-stem guide with the interlocking means engaged therein, thereby generally permanently to lock said cage and resilient spring fingers onto said valve-stem guide with the packing compressively confined between said cage and the end of the valve-stem guide.

2. The method of applying to valve stem guides a generally annular packing and a packing retainer cage provided with a plurality of circumferentially distributed radially resilient spring fingers having combined locking and groove-cutting means at their free ends, comprising centering said combined cage and groove-cutting means with the packing therein with respect to the valve-stem guide by a pin projecting through an aperture in the cage and extending into the bore of the guide, forcing the combined cage and the groove cutting means onto the valve-stem guide in a generally axial direction against the radial resiliency of said resilient spring fingers until the said packing is axially compressed between the cage and the end of the valve-stem guide and turning said combined cage and groove cutting means while the same are in this last mentioned position until a substantial annular groove is cut into the exterior of the valve-stem guide with the interlocking means engaged therein, thereby generally permanently to lock said cage and resilient spring fingers onto said valve-stem guide with the annular packing compressively confined between said cage and the end of the valve-stem guide.

3. The method of applying to valve stem guides a generally annular packing and a packing retainer cage provided with a plurality of circumferentially distributed radially resilient spring fingers inclined with respect to the axis of said guide generally near their ends, and said spring fingers having combined locking and groove cutting means at their free ends, comprising centering said combined cage and groove cutting means with respect to the valve-stem guide with said generally annular packing intermediate the cage and the valve-stem guide, forcing the combined cage and the groove cutting means onto the valve-stem guide in a generally axial direction against the radial resiliency of said resilient spring fingers until the said packing is axially compressed between the cage and the end of the valve-stem guide, and turning said combined cage and groove cutting means while the same are in this last mentioned position to groove the exterior of the valve-stem guide, and further compressing said packing by further turning said cage until the groove in the valve-stem guide becomes of substantial depth whereby the inclined ends of the spring fingers develop a camming action to draw the cage axially of the guide and thereby generally permanently to lock said cage and resilient spring fingers onto said valve-stem guide with the annular packing compressively confined between said cage and the end of the valve-stem guide.

4. An apparatus for grooving the outer surface of a valve-stem guide having a longitudinal bore therethrough, comprising in combination, a cutter-head provided with an aperture in its top of generally the same diameter as the bore of the valve-stem guide to be grooved, and a pin in said aperture adapted to enter said bore, said head having cutters adapted to groove said guide when the head is turned on said pin.

5. An apparatus for grooving the outer surface of a valve-stem guide having a longitudinal bore therethrough comprising, in combination, a cutter-head having an aperture in its top of generally the same diameter as the bore of the valve-stem guide to be grooved, said head having portions adapted to extend along the surface of the guide to be grooved, and a pin in said aperture and adapted to enter said bore, said portions having terminal cutters adapted to groove said guide when said cage is turned on said pin.

6. An apparatus for grooving the outer surface of a valve-stem guide having a longitudinal bore therethrough comprising, in combination, a cage the top of which is provided with an aperture of generally the same diameter as the bore of the valve-stem guide to be grooved, and a pin in said aperture adapted to enter said bore, said apertured cage having fingers adapted to extend along the surface of the guide to be grooved when said pin is in the aperture of such cage and in said bore, said fingers having terminal cutters adapted to groove the guide having the bore therein when the apertured cage is turned on said pin.

DELMAR D. ROBERTSON.
GEORGE L. BRIGGS.